US012462113B2

United States Patent
Morishita et al.

(10) Patent No.: US 12,462,113 B2
(45) Date of Patent: Nov. 4, 2025

(54) EMBEDDING AN UNKNOWN WORD IN AN INPUT SEQUENCE

(71) Applicant: NTT, Inc., Tokyo (JP)

(72) Inventors: Makoto Morishita, Tokyo (JP); Jun Suzuki, Tokyo (JP); Sho Takase, Tokyo (JP); Hidetaka Kamigaito, Tokyo (JP); Masaaki Nagata, Tokyo (JP)

(73) Assignee: NTT, Inc.

( * ) Notice: Subject to any disclaimer, the term of this patent is extended or adjusted under 35 U.S.C. 154(b) by 141 days.

(21) Appl. No.: 17/610,589

(22) PCT Filed: May 21, 2019

(86) PCT No.: PCT/JP2019/020174
§ 371 (c)(1),
(2) Date: Nov. 11, 2021

(87) PCT Pub. No.: WO2020/235024
PCT Pub. Date: Nov. 26, 2020

(65) Prior Publication Data
US 2022/0215182 A1 Jul. 7, 2022

(51) Int. Cl.
*G06F 40/44* (2020.01)
*G06F 40/30* (2020.01)
*G06N 3/045* (2023.01)

(52) U.S. Cl.
CPC ............ *G06F 40/44* (2020.01); *G06F 40/30* (2020.01); *G06N 3/045* (2023.01)

(58) Field of Classification Search
None
See application file for complete search history.

(56) References Cited

U.S. PATENT DOCUMENTS

| 10,346,721 | B2* | 7/2019 | Albright | G06N 3/045 |
| 10,679,148 | B2* | 6/2020 | Chen | G06N 3/063 |
| 11,604,956 | B2* | 3/2023 | Bradbury | G06N 3/047 |
| 2017/0323203 | A1* | 11/2017 | Matusov | G06F 16/30 |
| 2018/0121787 | A1 | 5/2018 | Hashimoto et al. | |
| 2019/0130273 | A1* | 5/2019 | Keskar | G06N 3/044 |

OTHER PUBLICATIONS

Zhang et al. "Subword-augmented Embedding for Cloze Reading Comprehension". arXiv:1806.09103v1 [cs.CL] Jun. 24, 2018. (Year: 2018).*

(Continued)

*Primary Examiner* — Jesse S Pullias

(57) ABSTRACT

An information learning apparatus includes a memory and a processor configured to perform generating, for each of processing units constituting an input sequence included in training data, a third embedded vector based on a first embedded vector for the processing unit and a second embedded vector corresponding to an unknown word; executing a process based on a learning target parameter, with the third embedded vector generated for each of the processing units as an input; and learning, for a processing result by the executing, the parameter based on an error of an output corresponding to the input sequence in the training data.

5 Claims, 10 Drawing Sheets

(56) References Cited

OTHER PUBLICATIONS

Sennrich, R., Haddow, B., and Birch, A. (2016) "Neural Machine Translation of Rare Words with Subword Units," in Proceedings of ACL, pp. 1715-1725.
Luong, M.-T., Pham, H., and Manning, C. D. (2015) "Effective Approaches to Attention-based Neural Machine Translation," in Proceedings of EMNLP.
Bahdanau, D., Cho, K., and Bengio, Y. (2015) "Neural Machine Translation by Jointly L earning to Align and Translate," in Proceedings of ICLR.
Makoto Morishita, Jun Suzuki, Masaaki Nagata (2018) "Improving Neural Machine Translation by Incorporating Hierarchical Subword Features" The 27th International Conference on Computational Linguistics (COLING).
Jun Suzuki, Sho Takase, Hidetaka Kamigaito, Makoto Morishita, Masaaki Nagata (2018) "An Empirical Study of Building a Strong Baseline for Constituency Parsing" The 56th Annual Meeting of the Association for Computational Linguistics (ACL), Jul. 20, 2018, pp. 612-618.

\* cited by examiner

EMBEDDING AN UNKNOWN WORD IN AN INPUT SEQUENCE

CROSS-REFERENCE TO RELATED APPLICATIONS

This application is a U.S. National Stage Application filed under 35 U.S.C. § 371 claiming priority to International Patent Application No. PCT/JP2019/020174, filed on 21 May 2019, the disclosure of which is hereby incorporated herein by reference in its entirety.

TECHNICAL FIELD

The present invention relates to an information processing apparatus, an information learning apparatus, an information processing method, an information learning method, and a program.

BACKGROUND ART

In recent neural machine translation research, subword units have been widely used (for example, Non-Patent Literature 1). Several advantages of using subword units in neural machine translation can be considered, and the most significant reason for using subword units is to deal with an unknown word problem at the time of language generation. Since conventional neural machine translation is performed in a method in which a word itself is generated, it is basically impossible to generate a word that does not appear in training data. On the other hand, when subword units are used, it becomes theoretically possible to generate all words that can be configured with subword units, and it becomes possible to explosively increase the number of words that a system is theoretically capable of generating.

CITATION LIST

Non-Patent Literature

Non-Patent Literature 1: Sennrich, R., Haddow, B., and Birch, A.: Neural Machine Translation of Rare Words with Subword Units, in Proceedings of ACL, pp. 1715-1725 (2016)

SUMMARY OF THE INVENTION

Technical Problem

In neural machine translation, a rare word (an infrequent word), for example, a word that appears only less than five times in training data is generally replaced with an unknown word. However, in the case of using subword units, an unknown word does not occur. Therefore, learning of an embedded vector (an embedded matrix) for an unknown word is not performed. On the other hand, there is a possibility that a character that is not included in training data is included in an input statement at the time of executing a task (at the time of inference). In this case, it becomes impossible to assign an appropriate embedded vector to such a character or a character string (such as a word) that includes the character.

Further, even when a subword character string is not used, it is thought that an embedded vector corresponding to an unknown word cannot be learned well for the following reasons. (1) Since an unknown word is an obvious replacement of a rare word, occurrences of unknown words in training data is relatively less frequent. (2) A sequence-to-sequence model is relatively ineffective for training of rare words.

The above problems are not limited only to neural machine translation in a narrow sense (language translation) but is common to neural machine translation in broad sense (a sequence-to-sequence model that outputs some sequence with a statement as an input). The sequence-to-sequence model also includes, in addition to the neural machine translation in the narrow sense, for example, document summarization, parsing, response statement generation, and the like in the category.

The present invention has been made in view of the above points, and an object is to improve generation accuracy of a sequence-to-sequence model that includes an unknown word.

Means for Solving the Problem

Therefore, in order to solve the above problems, an information learning apparatus includes: a generation unit generating, for each of processing units constituting an input sequence included in training data, a third embedded vector based on a first embedded vector for the processing unit and a second embedded vector corresponding to an unknown word; an execution unit executing a process based on a learning target parameter, with the third embedded vector generated for each of the processing units as an input; and a learning unit learning, for a processing result by the execution unit, the parameter based on an error of an output corresponding to the input sequence in the training data.

Effects of the Invention

It is possible to improve generation accuracy of a sequence-to-sequence model that includes an unknown word.

DESCRIPTION OF EMBODIMENTS

Figure 1:
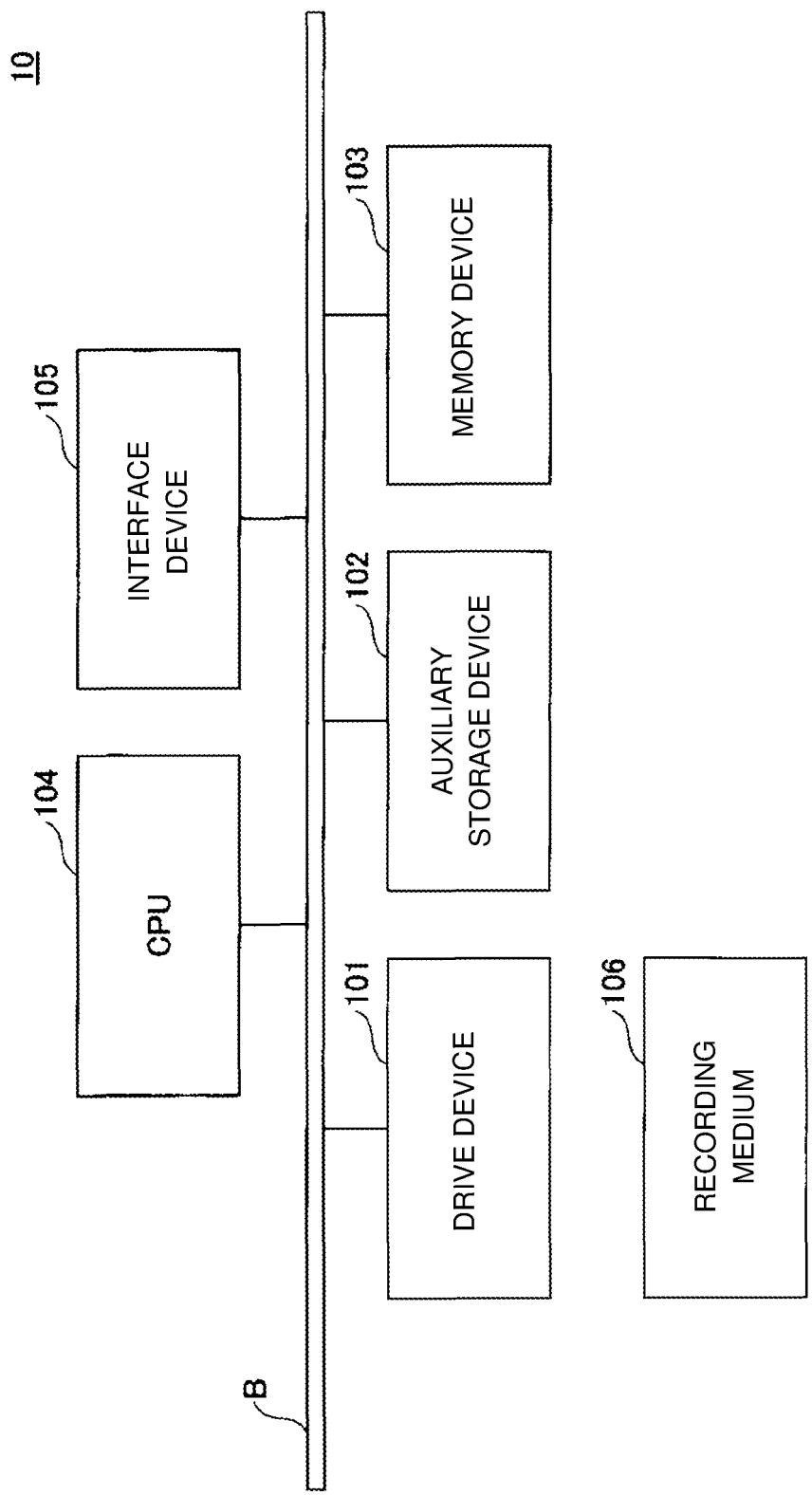
FIG. 1 is a diagram showing a hardware configuration example of a generation device 10 in a first embodiment.

A first embodiment will be described below based on the drawings. FIG. 1 is a diagram showing a hardware configuration example of a generation device 10 in the first embodiment. The generation device 10 in FIG. 1 has a drive device 100, an auxiliary storage device 102, a memory device 103, a CPU 104, an interface device 105, and the like, which are mutually connected via a bus B.

A program that realizes a process in the generation device 10 is provided by a recording medium 101 such as a CD-ROM. When the recording medium 101 in which the program is stored is set in the drive device 100, the program is installed into the auxiliary storage device 102 from the recording medium 101 via the drive device 100. However, it is not necessarily required to perform installation of the program from the recording medium 101, and the program may be downloaded from another computer via a network. The auxiliary storage device 102 stores the installed program and stores necessary files, data, and the like.

The memory device 103 reads out the program from the auxiliary storage device 102 and stores the program when a program start instruction is given. The CPU 104 executes functions of the generation device 10 according to the program stored in the memory device 103. The interface device 105 is used as an interface for connecting to a network.

Figure 2:
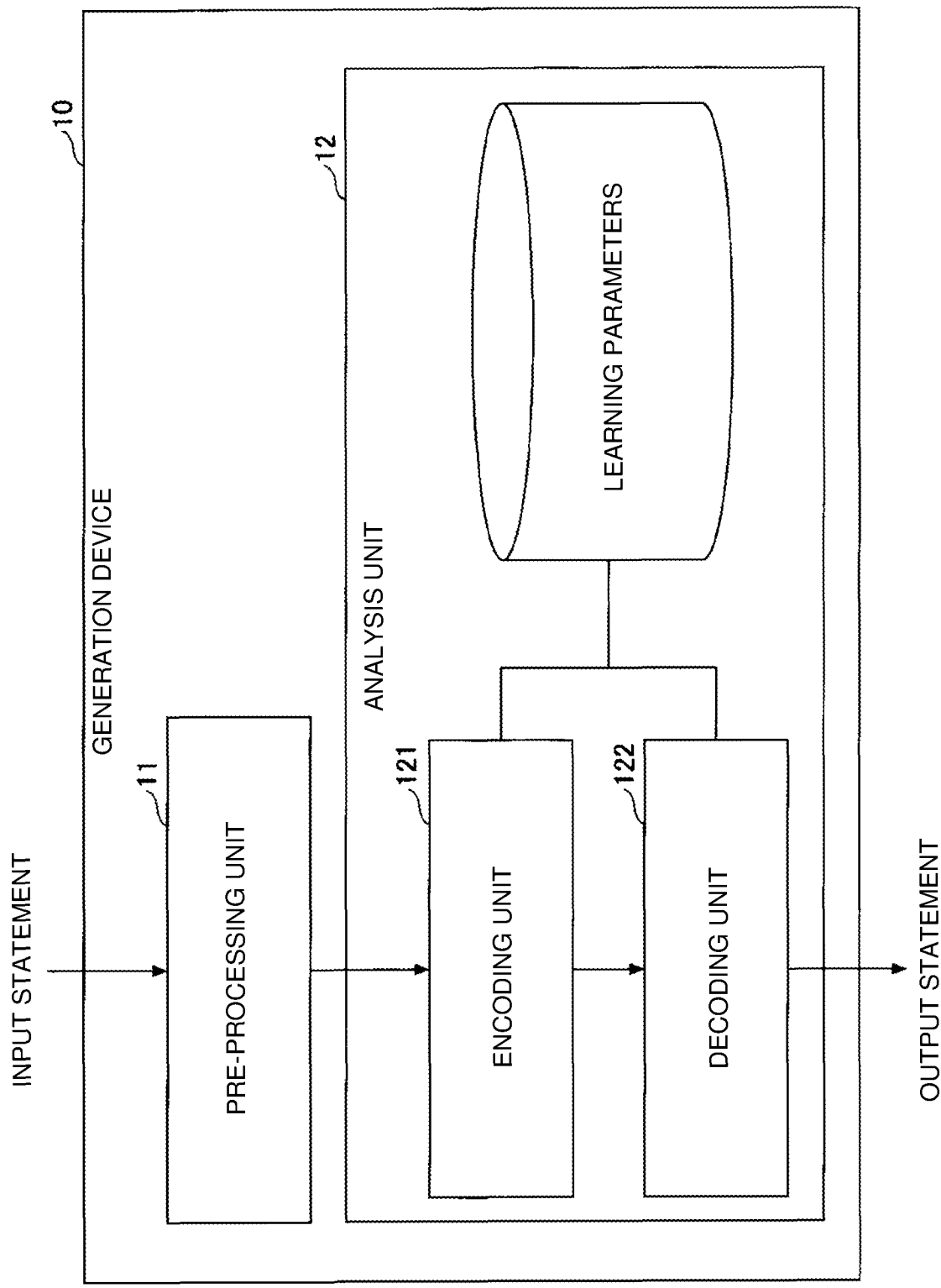
FIG. 2 is a diagram showing a functional configuration example of the generation device 10 at the time of translation in the first embodiment.

FIG. 2 is a diagram showing a functional configuration example of the generation device 10 at the time of translation in the first embodiment. In FIG. 2, the generation device 10 has a pre-processing unit 11, an analysis unit 12, and the like. These units are realized by processes that the one or more programs installed in the generation device 10 cause the CPU 104 to execute.

The analysis unit 12 executes neural machine translation (for example, natural language translation) based on sub-word units of an input statement, based on the following learned model (a neural network for which learning target parameters (hereinafter referred to as "learning parameters") are set), and generates an output statement. Here, for the learned model described before, an RNN encoder/decoder model equipped with an attention mechanism ("Bandanau, D., Cho, K., and Bengio, Y.: Neural Machine Translation by Jointly Learning to Align and Translate, in Proceedings of ICLR (2015)") used in "Luong, M.-T., Pham, H., and Manning, C. D.: Effective Approaches to Attention-based Neural Machine Translation, in Proceedings of EMNLP (2015)" is used as a baseline model.

In FIG. 2, the analysis unit 12 includes the encoding unit 121 and the decoding unit 122. The encoding unit 121 functions as an encoder of an encoder-decoder model or a sequence-to-sequence model. The decoding unit 122 functions as a decoder of the model.

First, an encoder and a decoder in the baseline model are formulated, and then, expansion of the encoder and the decoder in the encoding unit 121 and the decoding unit 122 in the present embodiment will be described. In the description below, it is assumed that $X=(x_i)^I_{i=1}$ is an input sequence (an input statement), and $Y=(y_j)^J_{j=1}$ is an output sequence (an output statement). Here, $x_i$ is a one-hot vector representation corresponding to the i-th input word $w_i$, and $y_j$ is a one-hot vector representation corresponding to the j-th output word $w_j$. Further, a one-hot vector list $(x_1, \ldots, x_I)$ is written as $(x_i)^I_{i=1}$, and a one-hot vector list $(y_1, \ldots, y_J)$ of a one-hot vector is written as $(y_j)^J_{j=1}$. Here, I is the number of words included in the input statement, and J is the number of words included in the output statement. Note that, for the baseline model, description will be made, with a word as a processing unit.

The encoder of the baseline model will be described. It is assumed that $\Omega^{(s)}(\bullet)$ is a function indicating all processes of the encoder configured with an RNN. In this case, as shown by Expressions (1) and (2) below, the encoder executes a process of receiving an input $X=(x_i)^I_{i=1}$ and returning a hidden state vector list $H_s=(h^s_i)^I_{i=1}$.

[Math. 1]

$$e_i = E x_i \tag{1}$$

$$H^{(s)} = \Omega^{(s)}((e_i)^I_{i=1}) \tag{2}$$

Here, E is an embedded matrix of the encoder of the baseline model. The embedded matrix E is a weighted matrix and constitutes learning parameters. In other words, E is sequentially updated at the time of learning.

The decoder (+attention mechanism) of the baseline model will be described. The decoder acquires such (an approximate solution of) an output sequence $\hat{Y}$ that appearance probability at the time of an input sequence X being given is maximized, using K-best beam-search. In the beam-search, the search is performed while K output candidates are held at each processing time j. Here, a process for selecting a word to be generated at each processing time j will be described. First, calculation is performed with Expression (3) below to acquire an embedded vector at the time j.

[Math. 2]

$$f_{j,k} = F \tilde{y}_{j-1,k} \tag{3}$$

Here, F is an embedded matrix of the encoder of the baseline model. The embedded matrix F is a weighted matrix and constitutes learning parameters. In other words, F is sequentially updated at the time of learning.

At this time, $\tilde{y}_{j-1,k}$ (here, $\tilde{y}$ corresponds to a symbol that has "~" attached immediately above y in an expression) is assumed to be a one-hot vector corresponding to a word with the k-th highest probability predicted at processing time j−1. It is assumed that, for any k, $\tilde{y}(k)_{0,k}$ is necessarily a one-hot vector corresponding to a special word BOS.

Next, the decoder calculates a final hidden layer vector $z_{j,k}$ using the RNN and the attention mechanism, using an obtained embedded vector $f_j$.

[Math. 3]

$$z_{j,k} = \text{RNN\_Attn}(u_{(j-1,k)}, f_{j,k}, H^{(s)}) \tag{4}$$

Here, it is assumed that RNNAttn is a function indicating all of processes of receiving an input vector $f_{j,k}$ and calculating the final hidden layer vector $z_{j,k}$ using the RNN and the attention mechanism. Here, it is assumed that $u_{(j,k)}$ is a value showing from which candidate, among the 1st to the K-th candidates at the processing time j−1, the k-th candidate at the processing time j has been generated. Therefore, $u_{(j,k)} = \{1, \ldots, K\}$ is satisfied. This value has a role of communicating which RNN was used to perform the process at the time j−1, at the next time j. Next, the decoder calculates a score to be a reference for selecting a word to be generated, from an obtained final hidden layer vector z using Expression (5) below.

[Math. 4]

$$o_{j,k} = W^{(o)} z_{j,k} + b^{(o)} \tag{5}$$

After that, the decoder performs the process of K-best beam-search and obtains the highest K candidates at the processing time j.

[Math. 5]

$$\{(\bar{y}_{j,k}, u_{(j,k)})\}_{k=1}^{K} = \text{BeamSearch}_k((o_{j,k})_{k=1}^{K}) \qquad (6)$$

Here, information about $u_{(j,k)}$ described before is also acquired together with the K candidates.

At the time of learning, a correct answer $y_{j-1,k}$ is used instead of a prediction result $\tilde{y}_{j-1,k}$ on the assumption of k=1.

Next, the encoding unit 121 and the decoding unit 122 that are expanded by the present embodiment will be described. With expansion of the encoder and the decoder, the generation device 10 of the present embodiment has the pre-processing unit 11. Therefore, the pre-processing unit 11 will be described first.

The pre-processing unit 11 executes pre-processing for an input statement such as a sentence. In the present embodiment, as the pre-processing, division into arbitrary processing units (such as words) is executed for an input statement, and embedded vectors (distributed representations) for divided processing units are determined. In the present embodiment, for generation (deriving) of the embedded vector for each of processing units, subword units of a plurality of layers for the processing unit are used. The subword units in the present embodiment are determined by a method using BPE (byte-pair encoding) (Non-Patent Literature 1).

In BPE, a process of gradually assembling subwords, from characters to a word, by dividing an input statement into the finest parts (characters) and sequentially merging (combining) subwords (including characters) is performed. When the number of merges is reached in the assembly process, the process is ended.

In general, a value of the number merges (m) is a hyperparameter, and a value empirically thought to be good is manually used. In recent neural machine translation, a value of thousands to tens of thousands is often used, and a value equal to or smaller than a thousand and a value greater than or equal to a hundred thousand tends not to be often used. This is because, if the number of merges is small, the process is close to a process for each character, and, since an amount of semantic information that each character has is limited, it is anticipated that the process is not so effective. Further, if the number of merges is large, the process is close to a process for each word, and it is thought that the meaning of introducing subwords is diminished. For such reasons, if it is assumed that the number of words required for translation is millions of words, the value of thousands to tens of thousands is empirically thought to be a reasonable value.

As a characteristic of BPE, the process corresponds to the process for each character if the number of merges is zero, and, if the number of merges is infinite, the process corresponds to the process for each word. Therefore, when a methodology of using subword units is summarized from a viewpoint of BPE, the methodology is grasped as a methodology of gradually (hierarchically) transitioning with discrete values from the process for each character to the process for each word, from a view point of the number of merges. In other words, BPE is grasped as a framework that includes the process for each character and the process for each word due to its nature. From this, in the first embodiment, the term "subword unit" is used as a concept that includes not only the meaning of a part of a word that intuitively comes to mind but also a word itself and a state of character units. In the first embodiment, it is assumed that m is a variable indicating the number of merges of BPE, and, especially, BPE (m=0) and BPE (m=∞) indicate a method using character units and a method using word units, respectively. Hereinafter, a description will be made in the context of subwords without distinguishing between the case of character units and the case of word units.

In BPE, since a lower subword unit with relatively small m is in a relationship of being included in a higher subword unit with relatively large m, the lower subword unit with relatively small m is uniquely determined relative to a subword unit with the largest m.

Figure 3:
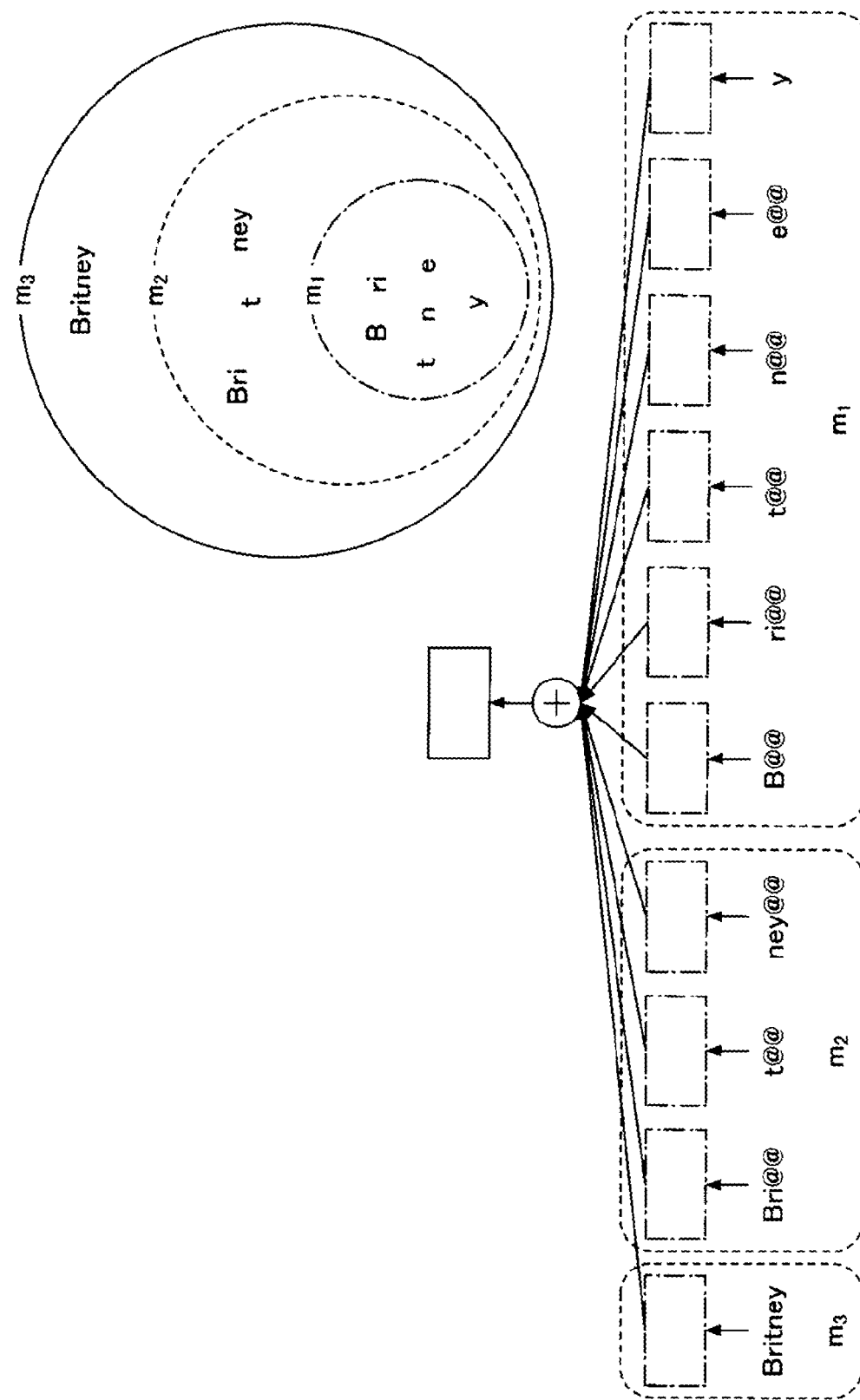
FIG. 3 is a diagram for illustrating characteristics of subword units generated by BPE.

FIG. 3 is a diagram for illustrating characteristics of subword units generated by BPE. FIG. 3 shows an example of subword units of a character string of "Britney". In FIG. 3, $m_1$, $m_2$ and $m_3$ show specific values of the number of merges m and have a relationship of $m_1 < m_2 < m_3$.

An example is shown in which, when the number of merges is $m_3$, there is one subword unit of "Britney", that is, "Britney". An example is shown in which, when the number of merges is $m_2$, there are three subword units of "Britney", "Bri", "t" and "ney". An example is shown in which, when the number of merges is $m_1$, there are five subword units of "Britney", "B", "ri", "t", "n", "e" and "y".

Note that a lower side diagram in FIG. 3 shows an example of information generated at the time of encoding by the encoding unit 121. A sign "@@" in the diagram is a special sign inserted to show that an original word unit is obtained by combining a subword unit with the next subword unit.

As shown in FIG. 3, a subword unit the number of merges m of which is relatively large completely includes any one or more subword units the number of merges m of which is relatively small (in other words, a subword unit the number of merges m of which is relatively large is configured with a combination of one or more subword units the number of merges m of which is relatively small). Specifically, a subword unit with the number of merges=$m_3$ includes one or more subword units with the number of merges=$m_2$ or $m_1$. Each subword unit with the number of merges=$m^2$ includes one or more subword units with the number of merges=$m^1$.

Therefore, for a certain statement set (a corpus), a subword unit with a relatively small number of merges is uniquely determined relative to a subword unit with a relatively large number of merges. Here, to be uniquely determined means that there is no randomness. In other words, it means that a value does not change each time calculation is performed.

Therefore, in BPE, it is possible to easily determined a subword unit using a mapping function. Therefore, the pre-processing unit 11 generates subword units from an input statement using the mapping function. At this time, the pre-processing unit 11 of the present embodiment generates not subword units with a single number of merges but subword units for a plurality of kinds of number of merges. In other words, the pre-processing unit 11 hierarchically generates subword units for each word and generates an embedded vector of the word based on the subword units.

Figure 4:
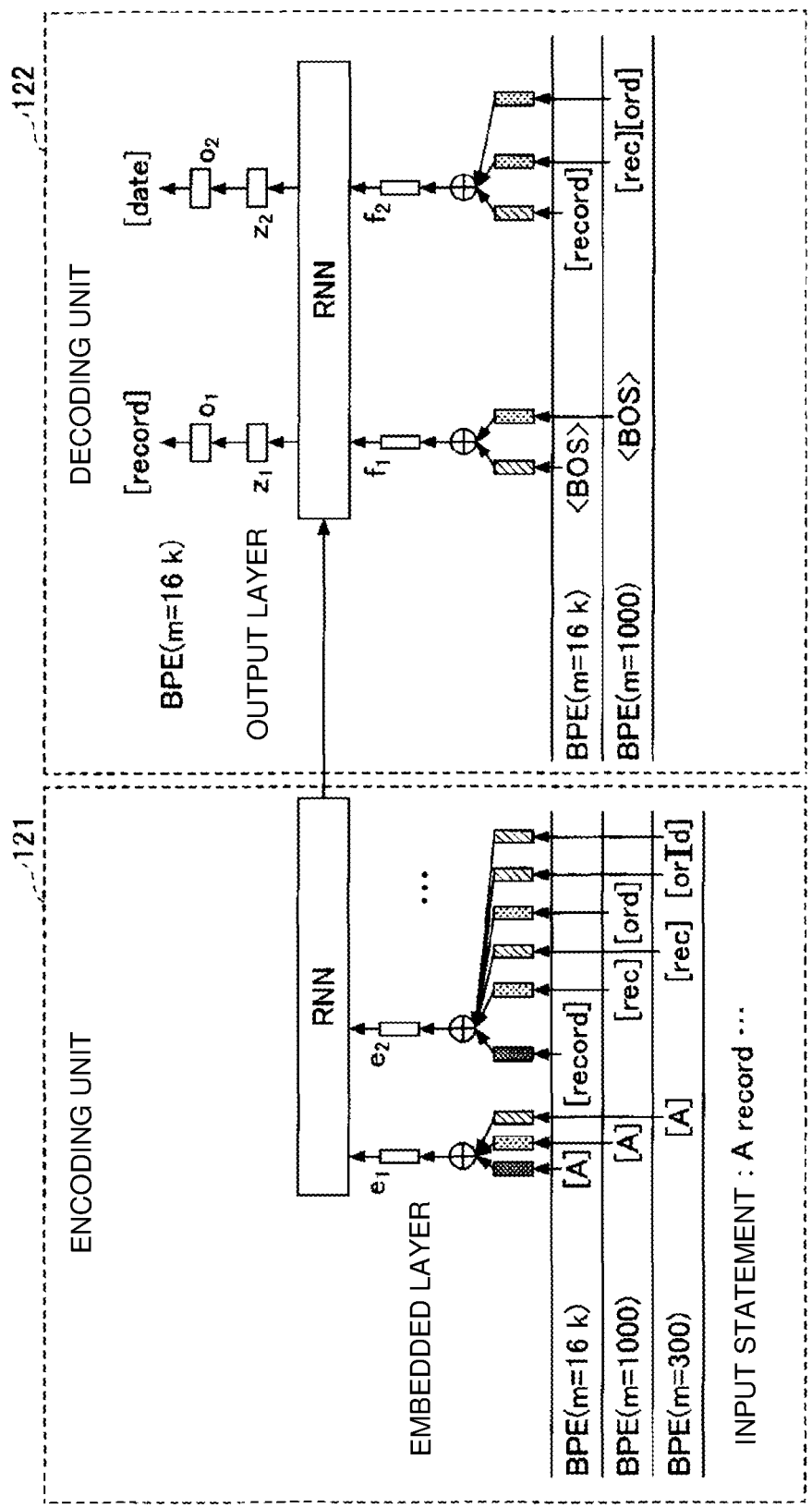
FIG. 4 is a diagram showing a model configuration example of an encoding unit 121 and a decoding unit 122 in the first embodiment.

Next, the encoding unit 121 and the decoding unit 122 of the present embodiment will be described. FIG. 4 is a diagram showing a model configuration example of the encoding unit 121 and the decoding unit 122 in the first embodiment.

As shown in FIG. 4, in the present embodiment, an input layer of each of the encoding unit 121 and the decoding unit 122 is expanded. More specifically, each input layer is expanded so that subword units of a plurality of layers (subword units with a plurality of kinds of number of merges) can be handled. FIG. 4 shows an example in which input of subword units of three layers is possible for the encoding unit 121, and input of subword units of two layers is possible for the decoding unit 122.

Note that it is conceivable to make a modification so that subword units of a plurality of layers are output for an output of the decoding unit 122. Though this can be technically easily dealt with if the modification is thought to be a matter of settings for multi-task learning, the decoding unit 122 needs a constrained decoding process and the like to guarantee consistency among a plurality of prediction results, due to its nature of performing a process of sequentially repeating word prediction. This causes a decoding process at the time of learning and evaluation to be complicated and, therefore, will not be dealt with in the present embodiment. Therefore, in the present embodiment, an idea of modifying the input layers of the encoding unit 121 and the decoding unit 122 in a state of guaranteeing that it is not necessary to change an output part of the decoding unit 122 is assumed to be a basic policy.

At this time, expansion of an input part of the decoding unit 122 is as follows.

[Math. 6]

$$f_{j,k} = \sum_r F_r \psi_r(\tilde{y}_{j-1,k}) \tag{7}$$

In other words, in the decoding unit 122 of the present embodiment, Expression (3) is changed to Expression (7). Here, $F_r$ is an embedded matrix of the decoding unit 122, and r is the number of merges. In other words, $F_r$ is an embedded matrix for the number of merges=r. For example, when the number of merges is set for the decoding unit 122 as shown in FIG. 4, r={1000,16 k} is satisfied. Note that the embedded matrix $F_r$ is a weighted matrix and constitutes learning parameters. In other words, $F_r$ is sequentially updated at the time of learning.

As described before, since it is assumed that prediction of the decoding unit 122 is single, $\Psi_r(\tilde{y}_{j-1,k})$ indicates a mapping function defined in advance with a prediction result $\tilde{y}_{j-1,k}$ as a key, and returns a binary vector the elements of which take 0 or 1. In other words, the binary vector returned by $\Psi_r(\bullet)$ is such a binary vector that elements of each subword unit of $\tilde{y}_{j-1,k}$ when the number of merges is r are 1. For example, if a subword unit of "record" in BPE (m=16 k) is predicted, a process of a binary vector in which elements corresponding to "rec" and "ord" to be subword units of "record" in BPE (m=1K) are 1 being derived by a mapping function is performed. In the case of r={1 k,16 k}, a sum total (a sum total of elements) of an embedded vector calculated for each r is calculated for $\tilde{y}_{j-1,k}$ by Expression (7).

Note that, as described above, since a subword unit with relatively small m is in a relationship of being included, a subword unit to be targeted is uniquely determined, and it is possible to easily determine a subword unit. In other words, since, as for a prediction result of the decoding unit 122, there is only one prediction result $\tilde{y}_{j-1,k}$, expansion of the input part of the decoding unit 122 described above corresponds to utilizing a subword unit that can be uniquely determined therefrom by the mapping function as a characteristic.

Similarly, expansion of an input part on the encoding unit 121 side is as follows.

[Math. 7]

$$e_i \sum_q E_q \phi_q(x_i) \tag{8}$$

In other words, in the encoding unit 121 of the present embodiment, Expression (1) is changed to Expression (8). Here, $E_q$ is an embedded matrix of the encoding unit 121, and q is the number of merges. In other words, $E_q$ is an embedded matrix for the number of merges=q. For example, when the number of merges is set for the encoding unit 121 as shown in FIG. 4, q={300,1000,16 k} is satisfied. Note that the embedded matrix $E_q$ is a weighted matrix and constitutes learning parameters. In other words, $E_q$ is sequentially updated at the time of learning.

Similarly to $\Psi_r(\tilde{y}_{j-1,k})$, $\phi_q(x_i)$ indicates a mapping function that can be uniquely derived from $x_i$, and returns a binary vector the elements of which take 0 or 1. In other words, the binary vector returned by $\emptyset_q(\bullet)$ is such a binary vector that elements of each subword unit of $x_i$ when the number of merges is q are 1. If q indicates a plurality of numbers of merges, a sum total (a sum total of elements) of a plurality of embedded vectors calculated for $x_i$ is calculated by Expression (8). In other words, such calculation is the same as what is shown in FIG. 5.

Figure 5:
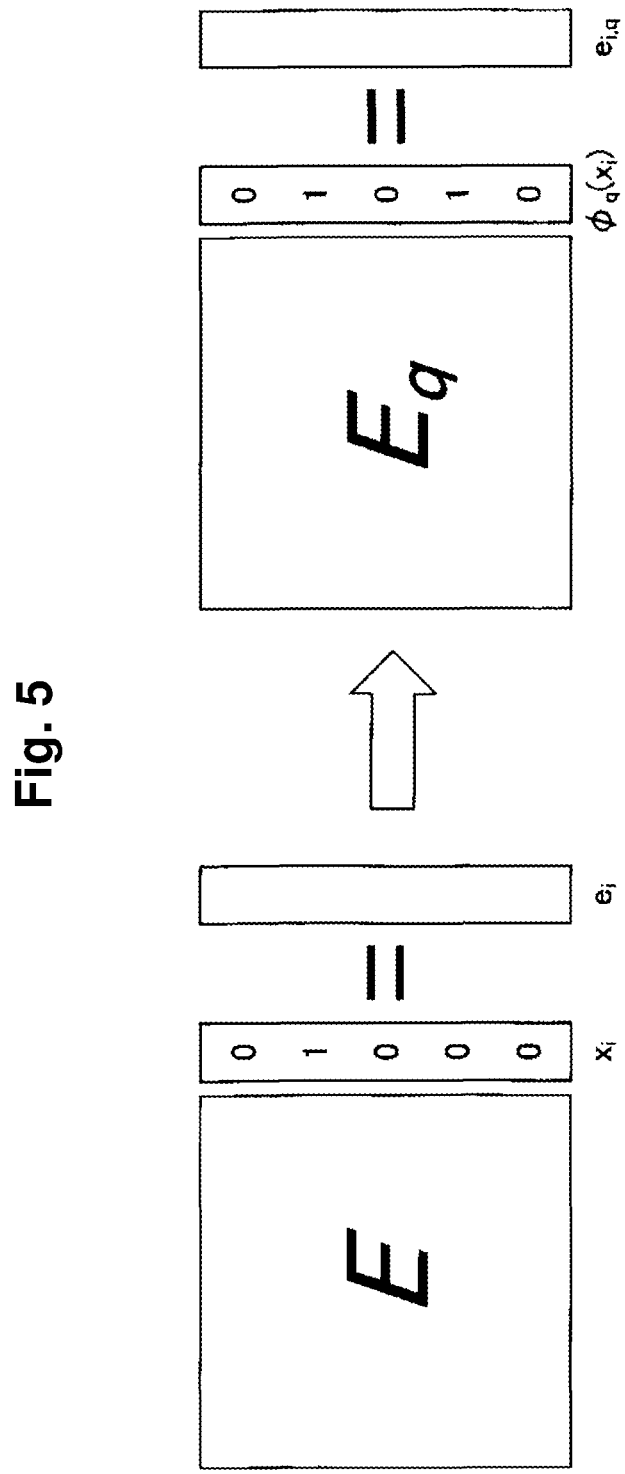
FIG. 5 is a diagram for illustrating expansion of an encoder.

FIG. 5 is a diagram for illustrating expansion of the encoding unit 121. In FIG. 5, the left side corresponds to Expression (1), and the right side corresponds to Expression (8). A vector ($x_i$) by which the embedded matrix E is multiplied on the left side is a one-hot vector representation, while a vector by which the embedded matrix $E_q$ is multiplied on the right side is such a binary vector ($\phi_q(x_i)$) that elements of each subword unit of $x_i$ for q are 1. Therefore, the plurality of elements of the binary vector can be 1. Here, $e_{i,q}$ is an embedded vector for q, for an input word $w_i$. According to Expression (8), a sum total of $e_{i,q}$ for all of the numbers of merges indicated by q is an embedded vector $e_i$ for the input word $x_i$.

Figure 6:
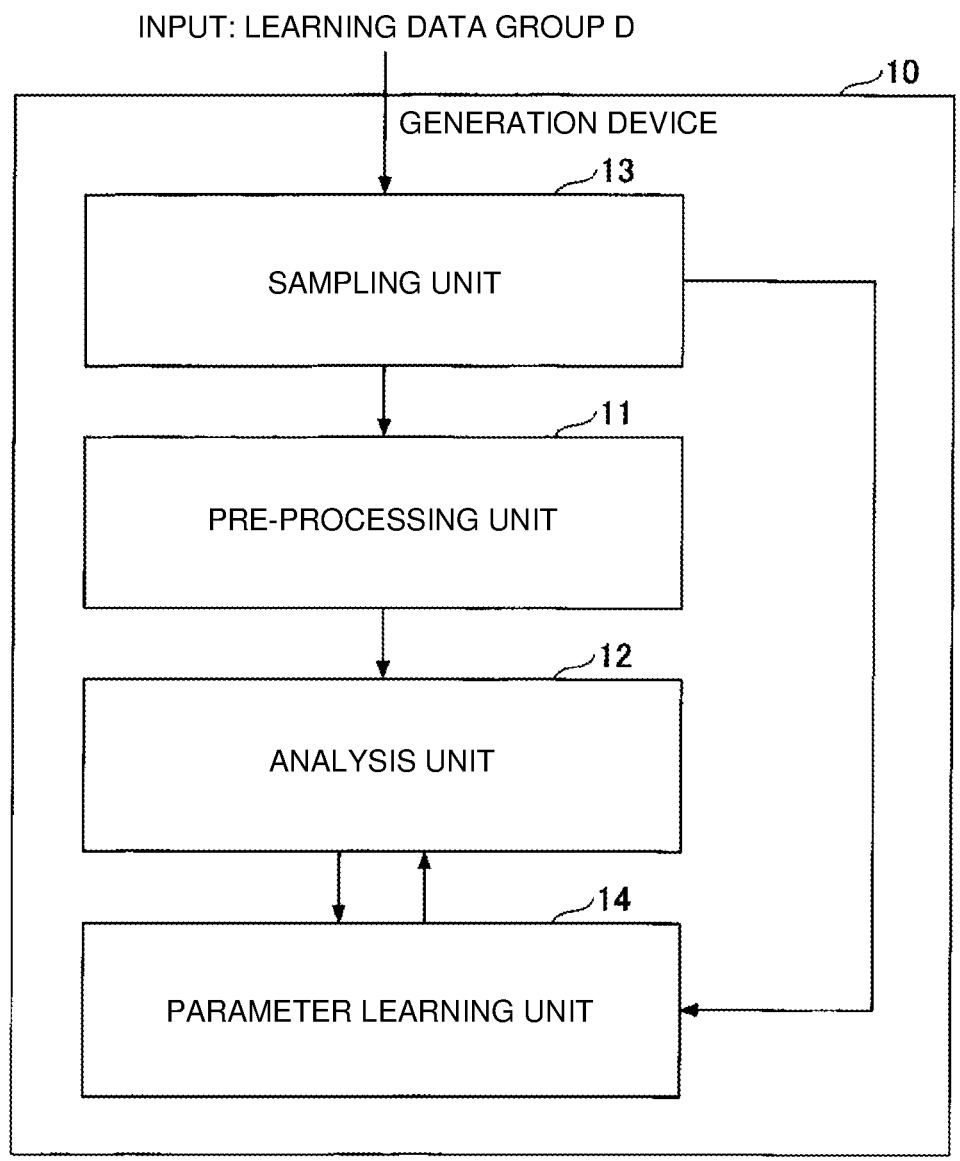
FIG. 6 is a diagram showing a functional configuration example of the generation device 10 at the time of learning in the first embodiment.

FIG. 6 is a diagram showing a functional configuration example of the generation device 10 at the time of learning in the first embodiment. In FIG. 6, the same units as in FIG. 2 will be given the same reference signs, and description thereof will be omitted.

At the time of learning, the generation device 10 further has a sampling unit 13 and a parameter learning unit 14. These units are realized by processes that one or more programs installed in the generation device 10 cause the CPU 104 to execute.

The sampling unit 13 samples (extracts) training data corresponding to one learning process from among a training data group D. The training data is a combination of an input sequence (an input statement) X and an output sequence (an output statement) Y corresponding to the X (to be a correct answer to the X).

The parameter learning unit 14 learns a learning model (a learning parameter group) of each of the encoding unit 121 and the decoding unit 122 based on the training data.

Note that the generation device 10 at the time of learning and the generation device 10 at the time of inference (at the time of execution of a task (generation of the output sequence Y based on the input sequence X)) may be configured with different computers.

Figure 7:
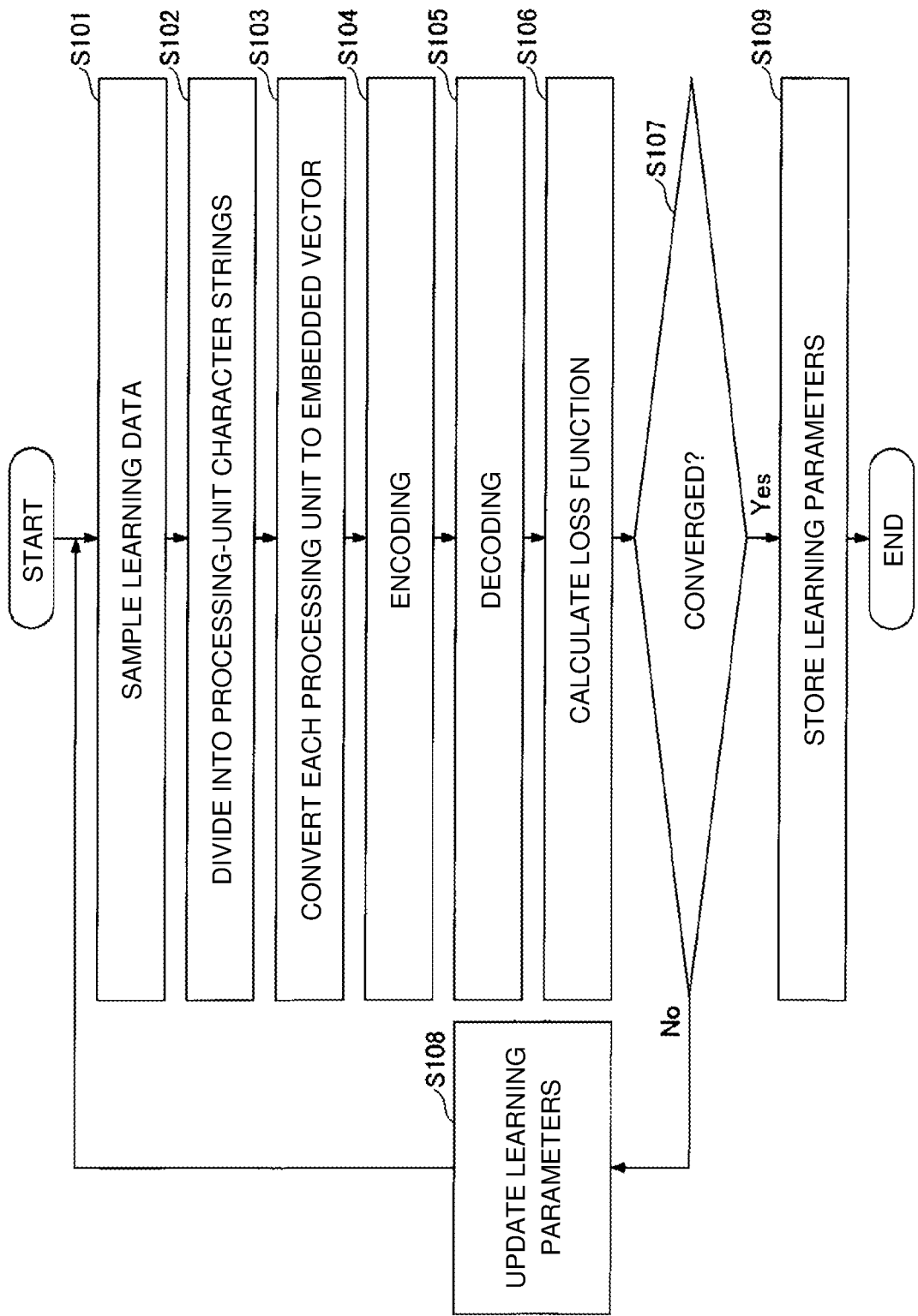
FIG. 7 is a flowchart for illustrating an example of processing steps of a learning process executed by the generation device 10 in the first embodiment.

Processing steps executed by the generation device 10 will be described below. FIG. 7 is a flowchart for illustrating an example of the processing steps of a learning process executed by the generation device 10 in the first embodiment.

At step S101, the pre-processing unit 11 samples a part of training data (hereinafter referred to as "target training data") from a training data group D prepared in advance. The sampling may be executed using a publicly known method.

Then, the pre-processing unit 11 divides an input sequence (an input statement) of the target training data into arbitrary processing units (for example, word units) (S102).

Then, the pre-processing unit 11 converts each processing unit of the input sequence into an embedded vector using Expression (8) (S103). Here, the layer of q in Expression (8) (that is, the number of merges of BPE) is set as a hyperparameter in advance. By the embedded vector being generated for each processing unit using Expression (8), an embedded vector based on hierarchical subword units is obtained for each processing unit.

Then, the encoding unit 121 executes encoding calculation by a publicly known method, with a sequence of the embedded vector of each processing unit as an input (S104).

Then, the decoding unit 122 executes decoding calculation by a publicly known method, with a calculation result by the encoding unit 121 (for example, a calculation result of a recursive layer of the encoding unit 121) as an input (S105). Here, an embedded vector input to the decoding unit 122 for the j-th processing unit at this time is calculated by Expression (7) being applied to a processing unit output from the decoding unit 122 for the (j−1)th processing unit. Here, the layer of r in Expression (7) (that is, the number of merges of BPE) is set as a hyperparameter in advance. Note that the layer of r may be the same as or different from the layer of q. By an embedded vector being generated using Expression (7), an embedded vector based on hierarchical subword units is obtained for the processing unit. After that, a prediction result (an inference result) of the j-th processing unit is obtained based on the embedded vector and Expressions (4) to (6).

Then, based on an output sequence prediction result, which is a processing result by the decoding unit 122, and an output sequence of the target training data, the parameter learning unit 14 calculates a loss function (that is, an error between the output sequence (an output statement) of the target training data and the output sequence prediction result, which is a calculation result by the decoding unit 122) by a publicly known method (S106).

Then, the parameter learning unit 14 determines whether a calculation result of the loss function satisfies a predetermined convergence condition or not (S107). If the calculation result does not satisfy the convergence condition (S107: No), the parameter learning unit 14 updates learning parameters of each of the encoding unit 121 and the decoding unit 122 by a publicly known method, based on the calculation result (S108). In this case, step S101 and the subsequent steps are repeated based on the updated learning parameters.

On the other hand, if the calculation result of the loss function satisfies the convergence condition (S107: Yes), the parameter learning unit 14 stores the learning parameters of each of the encoding unit 121 and the decoding unit 122 at this time point, for example, into the auxiliary storage device 102 or the like (S109). As a result, the encoding unit 121 and the decoding unit 122 become a learned neural network.

Note that, at the time of executing a task after learning (at the time of executing neural machine translation), a translation target input statement X is input at step S101, and a translation-result output statement Y is output at step S105. Step S106 and the subsequent steps are not executed.

Experiments about the encoding unit 121 and the decoding unit 122 learned as described above and experimental results are as described in and after "4. Experiments" of "Makoto Morishita, Jun Suzuki, Masaaki Nagata. Improving Neural Machine Translation by Incorporating Hierarchical Subword Features The 27th International Conference on Computational Linguistics (COLING)". For example, in "Table 9", translation results of the baseline model and the present embodiment are shown about machine translation from French to English.

According thereto, it is seen that an unknown or infrequent word such as "Britney Spears" can be correctly translated (generated) in the present embodiment.

As described above, according to the first embodiment, for an input of the encoding unit 121 and an input of the decoding unit 122, various numbers of subword units with various lengths are generated for one processing unit. Therefore, the various numbers of subword units with various lengths can be hierarchically input for one processing unit. As a result, it is possible to improve generation accuracy of a sequence-to-sequence model as shown in the experimental results. Note that subword units may be hierarchized only for any one of an input of the encoding unit 121 and the decoding unit 122. In other words, for the other, subword units with a single number of merges may be input.

Further, in the first embodiment, BPE is adopted as a subword unit generation method. BPE has a characteristic that a subword unit with a relatively long character string length necessarily includes a subword unit with a relatively short character string length. As a result, it is possible to improve processing efficiency of neural machine translation.

Note that the first embodiment is applicable to a sequence-to-sequence model for purposes other than neural machine translation (for example, document summarization, parsing, response statement generation, and the like).

As an example, an example of application to parsing will be described as a second embodiment. In the second embodiment, points different from the first embodiment will be described. Points not especially mentioned in the second embodiment may be similar to the first embodiment.

Figure 8:
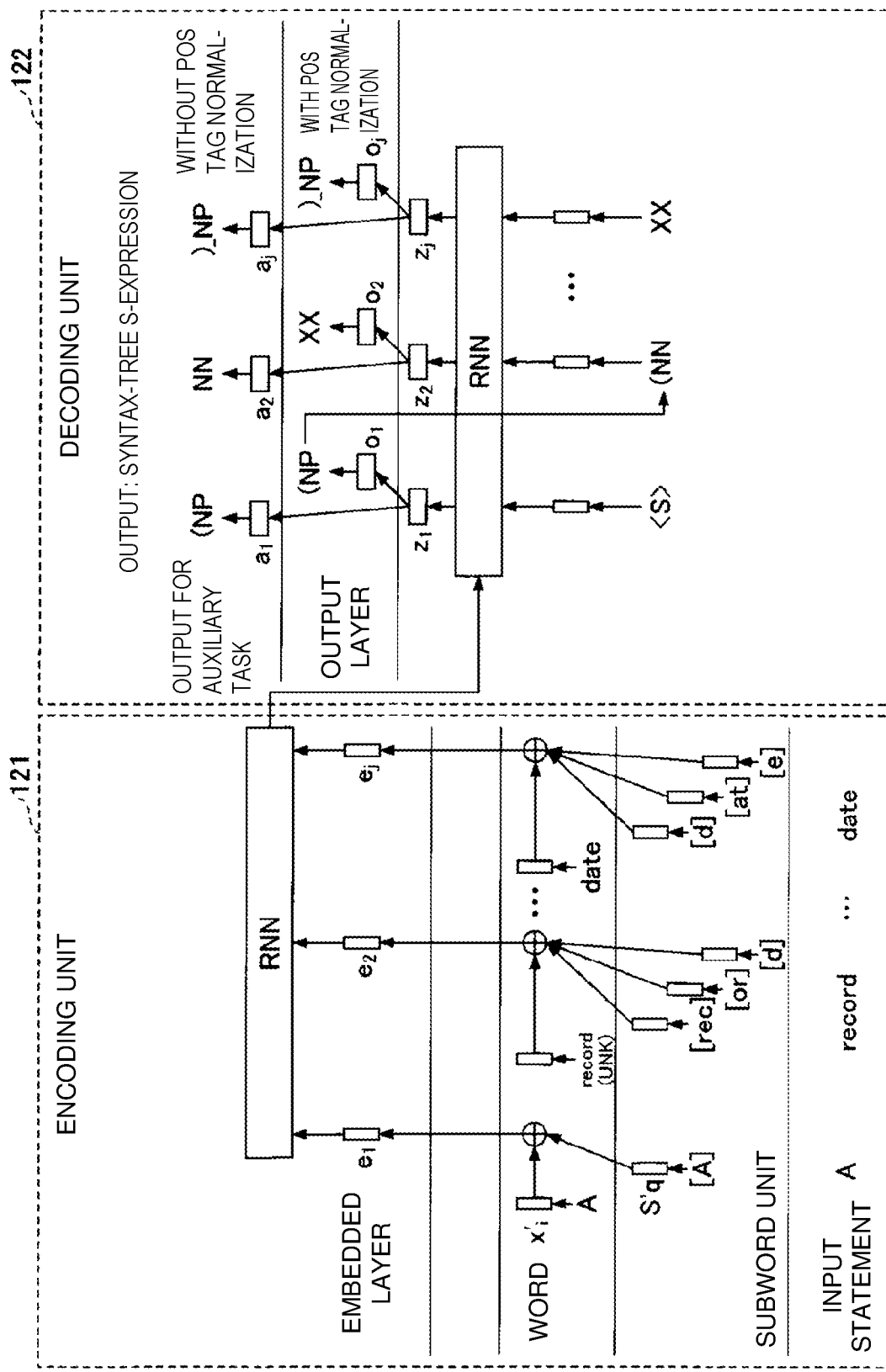
FIG. 8 is a diagram showing a model configuration example of the encoding unit 121 and the decoding unit 122 in a second embodiment.

FIG. 8 is a diagram showing a model configuration example of the encoding unit 121 and the decoding unit 122 in the second embodiment. In other words, FIG. 4 is replaced with FIG. 8 in the second embodiment.

As shown in FIG. 8, the encoding unit 121 is expanded so that subword units of a plurality of layers can be input. As for the encoding unit 121, $x'_i$ indicates an embedded vector of the i-th input word $w_i$ in an input statement, and $s'_q$ indicates subword units of the number of merges m=q (the q-th layer) for $w_i$. Note that, in the second embodiment, a word and subword units about the word are clearly distinguished. In other words, as for subword units in the second embodiment, the case of the number of merges m=∞ is not included. As a result, Expression (1) is replaced with Expression (9) below. In other words, in the second embodiment, the pre-processing unit 11 calculates an embedded vector $e_i$ for an input word $w_i$ by Expression (9) below.

[Math. 8]

$$e_i = E(x_i) + \sum_q E_q(s_q) \qquad (9)$$

Here, $x_i$ is a one-hot vector representation of the input word $w_i$, $s_q$ is a binary vector of a subword unit group of the input word $w_i$ in the case of the number of merges m=q.

Note that distinction between a word and subword units is for the purpose of convenience, and $x'_i$ may be represented by $s'_q$ in the case of m=∞. In this case, instead of Expression (9), Expression (1) may be used.

Meanwhile, the decoding unit 122 of FIG. 8 outputs an S-expression of a syntax-tree. A publicly known decoder can be used for the decoding unit 122 that outputs the S expression.

Note that the decoding unit 122 of FIG. 8 is configured so that a POS tag obtained by incorporating a linearized form without POS tag normalization is jointly estimated as an auxiliary task. Here, the configuration is based on the general knowledge that, if an effective auxiliary task related to a target task can be found, a multi-task learning expansion function can improve task performance. In particular, scores in a linearized form with and without POS tag normalization are independently estimated as $o_j$ and $a_j$ at the same time on an output layer of the decoding unit 122 by the following expression.

[Math. 9]

$$O_j = W^{(o)} a_j, \text{ and } q_j = W^{(a)} z_j \tag{10}$$

Here, $W^{(o)}$ is a decoder output matrix for words of an output by POS tag normalization. Further, $W^{(a)}$ is a decoder output matrix for output words without POS tag normalization.

Next, a third embodiment will be described. In the third embodiment, points different from the second embodiment will be described. Points not especially mentioned in the third embodiment may be similar to the second embodiment.

In a sequence-to-sequence model, a rare word (an infrequent word), for example, a word that appears only less than five times in training data is replaced with an unknown word. In the case of using subword units like the first and second embodiment, however, unknown words would not occur. Therefore, learning of an embedded vector (an embedded matrix) for an unknown word is not performed. On the other hand, there is a possibility that a character that is not included in training data is included in an input statement at the time of executing a task (at the time of inference). In this case, it becomes impossible to assign an appropriate embedded vector to such a character or a character string (such as a word) that includes the character.

Further, even when a subword character string is not used, it is thought that an embedded vector corresponding to an unknown word cannot be learned well for the following reasons. (1) Since an unknown word is an obvious replacement of a rare word, occurrences of unknown words in training data is relatively less frequent. (2) A sequence-to-sequence model is relatively ineffective for training of rare words.

Figure 9:
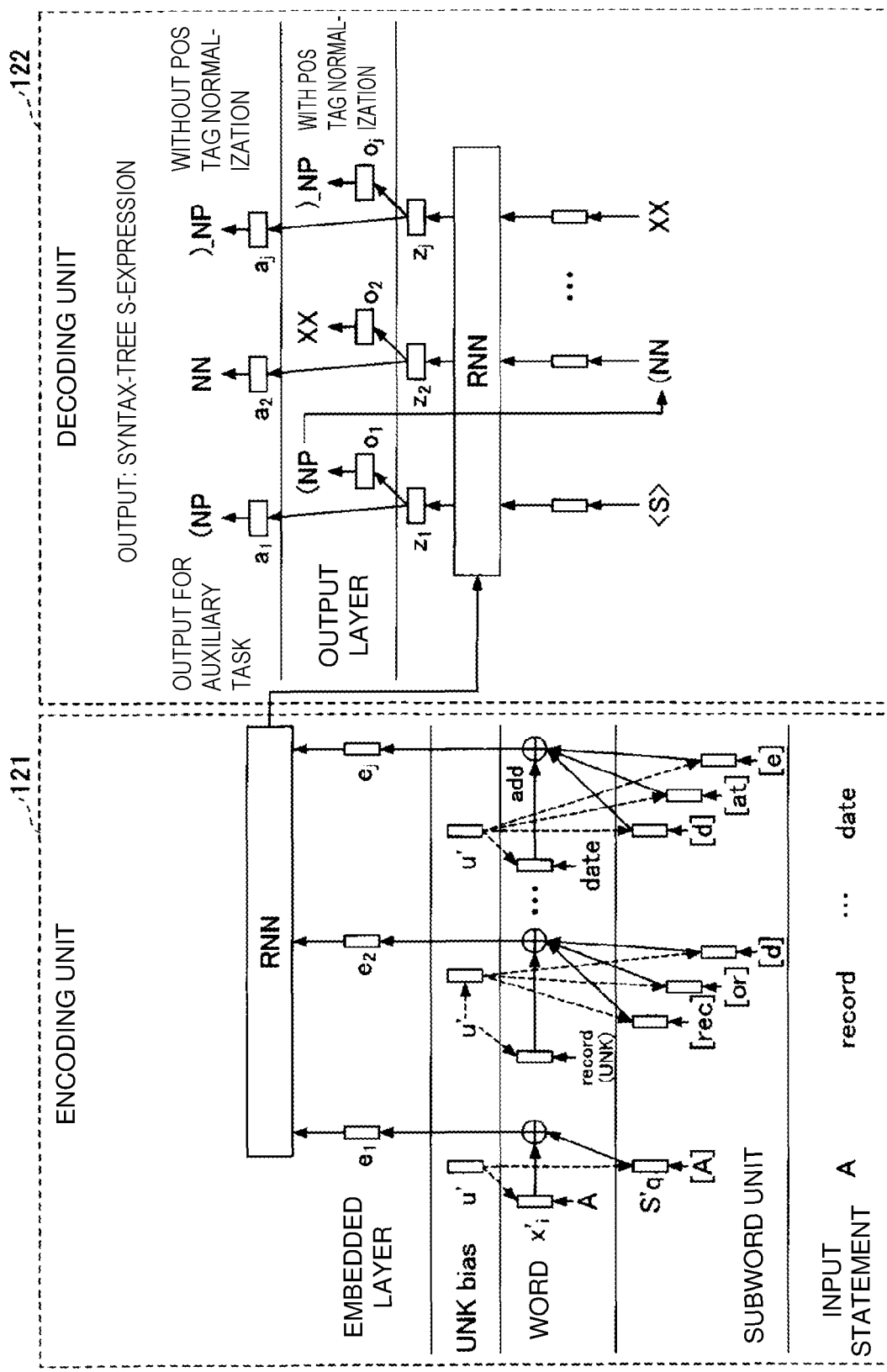
FIG. 9 is a diagram showing a model configuration example of the encoding unit 121 and the decoding unit 122 in a third embodiment.

In the third embodiment, an example of solving such problems will be described. FIG. 9 is a diagram showing a model configuration example of the encoding unit 121 and the decoding unit 122 in the third embodiment. In FIG. 9, differences from FIG. 8 will be described.

As shown in FIG. 9, an embedded vector (UNK bias) u' for an unknown word is added to an embedded vector $x'_i$ of an input word $w_i$ and an embedded vector $s'_q$ for each subword unit of the input word $w_i$. In other words, in the third embodiment, the pre-processing unit 11 calculates an embedded vector $e_i$ for the input word $w_i$ using Expression (11) below.

[Math. 10]

$$e_i = E(x_i + u) + \sum_q E_q(s_q + u) \tag{11}$$

Here, u is a one-hot vector representation for an unknown word and is known in learning. Note that, since $x_i = u$ is satisfied when the input word $w_i$ is an unknown word, Expression (11) is transformed as shown by Expression (12).

[Math. 11]

$$e_i = 2\overline{u'} + \sum_q E_q(s_q + u) \tag{12}$$

By the embedded vector $e_i$ for the input word $w_i$ being calculated based on Expression (11) to perform learning, a one-hot vector representation for an unknown word plays a role of a kind of bias for the whole. It is conjectured that this is because, by performing learning while always adding a vector of an unknown word to a vector of an input word, an embedded vector of the unknown word having average characteristics is learned (that is, $E_q$ is learned) for all words. If an embedded vector of an unknown word is learned so as to have average characteristics for all words, it is thought that, even if an input unknown word $w_U$ is semantically distant from an unknown word set that appears in a corpus, an embedded vector given to $w_U$ tends to be close to characteristics of original $w_U$ when compared with a conventional method. As a result, it is possible to expect improvement of generation accuracy of a sequence-to-sequence model that includes an unknown word.

Note that, as for experiments about the third embodiment and effects confirmed by the experiments, please refer to "4 Experiments" and "4.1 Results" of "Jun Suzuki, Sho Takase, Hidetaka Kamigaito, Makoto Morishita, Masaaki Nagata. An Empirical Study of Building a Strong Baseline for Constituency Parsing The 56th Annual Meeting of the Association for Computational Linguistics (ACL)".

Next, a fourth embodiment will be described. In the fourth embodiment, points different from the third embodiment will be described. Points not especially mentioned in the fourth embodiment may be similar to the third embodiment.

In the third embodiment, a model in which subword units of each word of an input sentence are input to the encoding unit 121 has been described. However, the method of performing learning while always adding a vector of an unknown vector to a vector of an input word may be applied to a model in which subword units are not input. In the fourth embodiment, such a model will be described.

Figure 10:
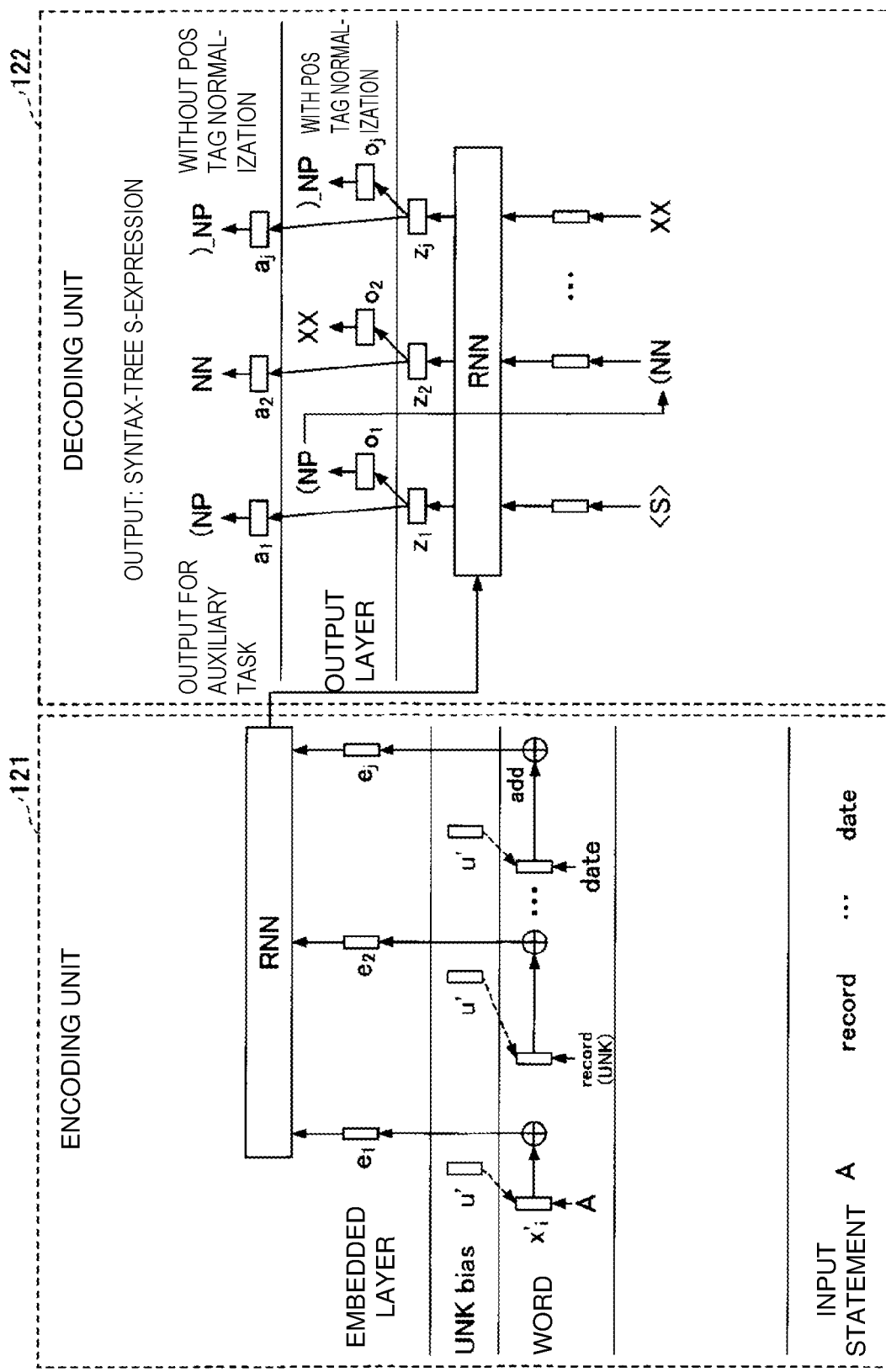
FIG. 10 is a diagram showing a model configuration example of the encoding unit 121 and the decoding unit 122 in a fourth embodiment.

FIG. 10 is a diagram showing a model configuration example of the encoding unit 121 and the decoding unit 122 in the fourth embodiment. In FIG. 10, differences from FIG. 10 will be described.

In FIG. 10, subword units are not input to the encoding unit 121. Meanwhile, for each input word $w_i$, an embedded vector (UNK bias) u' for an unknown word is added to an embedded vector $x'_i$ of the input word $w_i$. In other words, in the fourth embodiment, the pre-processing unit 11 calculates an embedded vector $e_i$ for the input word $w_i$ with Expression (13) below.

[Math. 12]

$$e_i = E(x_i + u) \tag{13}$$

Thus, for a model in which subword units are not input, addition of an embedded vector (UNK bias) u' for an unknown word may be also performed. By doing so, effects similar to the effects of the third embodiment can be expected from such a model.

Note that each of the above embodiments may be applied not only to a model used as a set of an encoder and a decoder like an encoder-decoder model but also to a model in which an encoder is used alone. Further, each of the above embodiments may be applied to a model in which a decoder is replaced with a determination device. In this case, the generation device 10 has a determination unit that functions as the determination device instead of the decoding unit 122. An output from the determination unit is not an output sequence (an output statement) but a determination result. As examples of the function of the determination unit, determining, with a statement as an input, whether the statement is a question statement or not (binary classification), estimating, with a statement as an input, which of predetermined categories the statement belongs to (multi-class classification) and the like are given.

Note that, in each of the above embodiments, the generation device 10 is an example of an information processing apparatus and an information learning apparatus. The pre-processing unit 11 is an example of a generation unit. The encoding unit 121 or the decoding unit 122 is an example of an execution unit. The parameter learning unit 14 is an example of a learning unit. The embedded vector $x'_i$ of the input word $w_i$, and the embedded vector $s'_q$ of each subword unit of the input word $w_i$ are examples of a first embedded vector. The embedded vector u' is an example of a second embedded vector. The embedded vector $e_i$ in the third and fourth embodiments is an example of a third embedded vector.

Embodiments of the present invention have been described above in detail. However, the present invention is not limited to such particular embodiments, and various modifications and changes are possible within a range of the spirit of the present invention described in Claims.

REFERENCE SIGNS LIST

10 Generation device
11 Pre-processing unit
12 Analysis unit
13 Sampling unit
14 Parameter learning unit
100 Drive device
101 Recording medium
102 Auxiliary storage device
103 Memory device
104 CPU
105 Interface device
121 Encoding unit
122 Decoding unit
B Bus

The invention claimed is:

1. An information learning apparatus comprising:
a memory and a processor configured to:
generate, for each of processing units constituting an input sequence included in training data, a third embedded vector by adding a second embedded vector corresponding to an unknown word to a first embedded vector of each processing unit regardless of whether said each processing unit represents the unknown word or not;
execute, using training data, a process based on a learning target parameter of a sequence-to-sequence model to generate an inference result, with the third embedded vector generated for said each processing unit as an input; and
learn the learning target parameter of the sequence-to-sequence model, wherein the learning target parameter is based on an error between the inference result of the execution and a ground truth output corresponding to the input sequence in the training data, wherein a learnt neural network with the learnt learning target parameter converts an input statement into one or more output words, and the input statement comprises the unknown word.

2. A non-transitory computer-readable recording medium having computer-readable instructions stored thereon, which when executed, cause a computer including a memory and a processor to execute respective operations in the information processing apparatus according to claim 1.

3. An information processing apparatus comprising:
a memory and a processor configured to perform
generating, for each of processing units constituting an input sequence, a third embedded vector by adding a second embedded vector corresponding to an unknown word to a first embedded vector for each processing unit regardless of whether said each processing unit represents the unknown word or not; and
executing, using training data, a process based on a learned parameter of a sequence-to-sequence model to generate an inference result, with the third embedded vector generated for said each processing unit as an input, wherein the learned parameter is based on an error between the inference result of a previous execution of the process and a ground truth output corresponding to the input sequence in training data, a learnt neural network with the learnt learning target parameter converts an input statement into one or more output words as the inference result, and the input statement comprises the unknown word.

4. A non-transitory computer-readable recording medium having computer-readable instructions stored thereon, when executed, cause a computer including a memory and a processor to execute respective operations in the information processing apparatus according to claim 3.

5. An information learning method executed by a computer including a memory and a processor the method comprising:
generating, for each of processing units constituting an input sequence included in training data, a third embedded vector by adding a second embedded vector corresponding to an unknown word to a first embedded vector of each processing unit regardless of whether said each processing unit represents the unknown word or not;
executing, using training data, a process based on a learning target parameter of a sequence-to-sequence model to generate an inference result, with the third embedded vector generated for said each processing unit as an input; and
learning the learning target parameter of the sequence-to-sequence model, wherein the learning target parameter is based on an error between the inference result of the execution and a ground truth output corresponding to the input sequence in the training data, wherein a learnt neural network with the learnt learning target parameter converts an input statement into one or more output words, and the input statement comprises the unknown word.

* * * * *